April 2, 1935.    R. J. PARSONS    1,996,708
SOIL STERILIZER
Filed Dec. 19, 1933    2 Sheets-Sheet 1
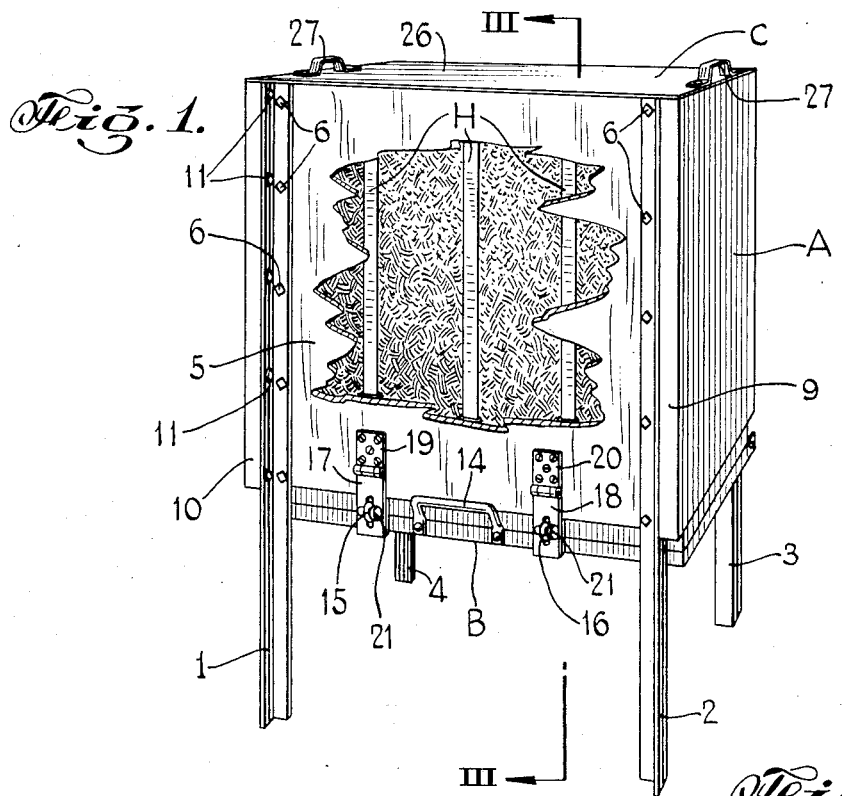
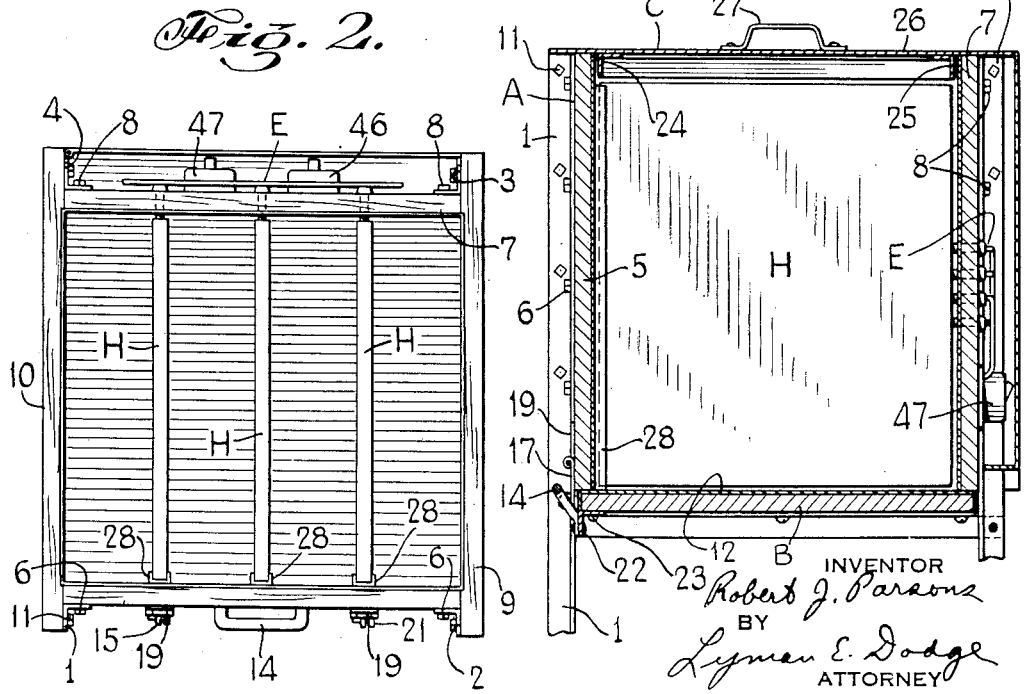
INVENTOR
Robert J. Parsons
BY
Lyman E. Dodge
ATTORNEY

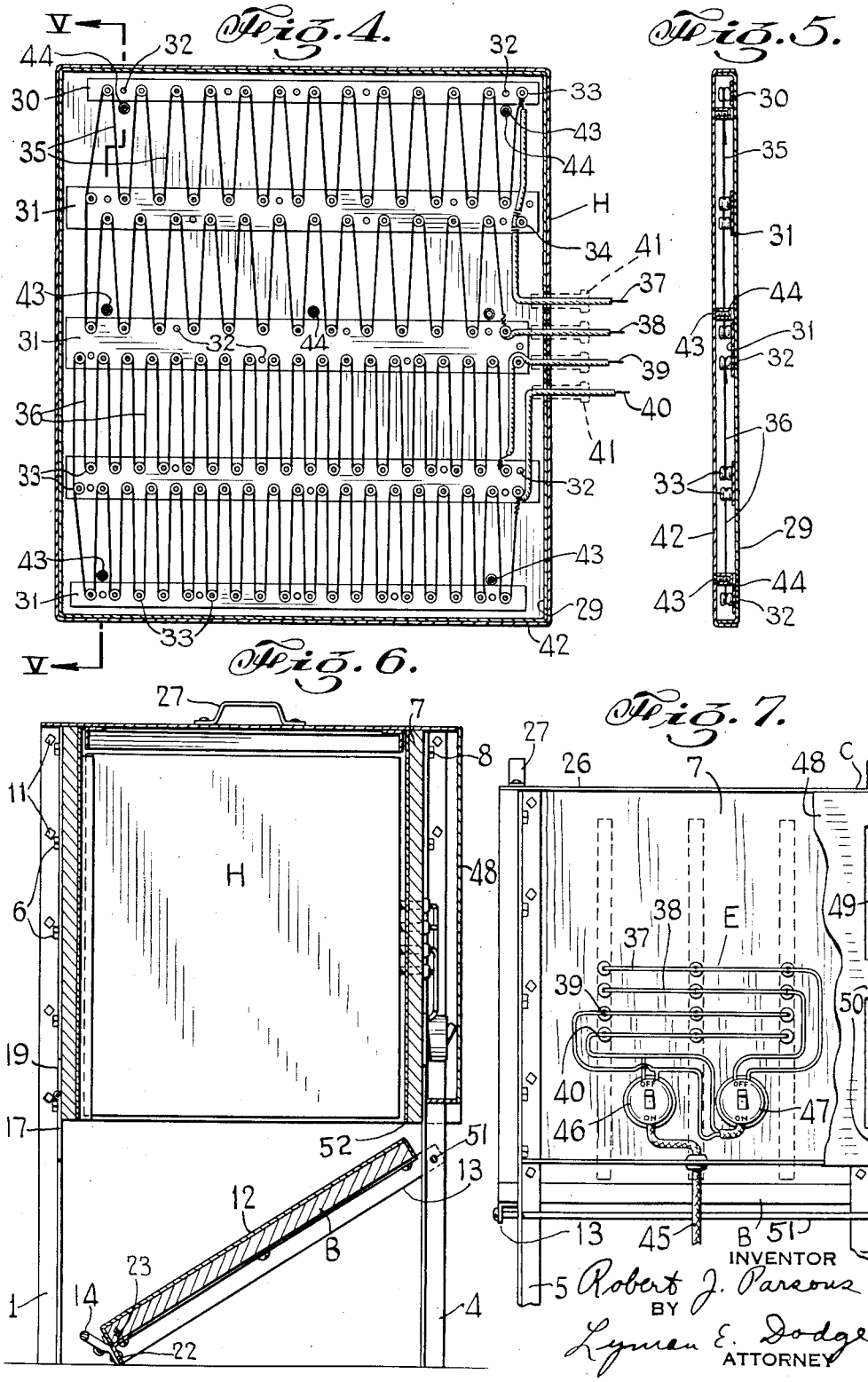
April 2, 1935.   R. J. PARSONS   1,996,708
SOIL STERILIZER
Filed Dec. 19, 1933   2 Sheets-Sheet 2

Patented Apr. 2, 1935

1,996,708

UNITED STATES PATENT OFFICE 1,996,708

SOIL STERILIZER

Robert J. Parsons, Schenectady, N. Y., assignor to Consolidated Car Heating Company, Inc., Albany, N. Y., a corporation of New York Application December 19, 1933, Serial No. 703,042

4 Claims. (Cl. 219—35)

This invention relates to soil treatment, and more particularly to soil sterilization.

Those acquainted with the art of plant production, and particularly the production of plants from seeds, are well aware of the difficulties which are sometimes and even often encountered in the germination thereof.

A large number of the most injurious plant diseases are harbored by the soil and transmitted from the soil to seeds and living plants. Some of these diseases are particularly destructive to germinating seeds and young plants.

The soil also bears large numbers of weed seeds and hibernating insects. The insects feed upon the seeds and sprouting plants, and the weed seeds germinate and withdraw from the soil the nourishment which otherwise would be usable by the desired germinating seeds.

Not only do plant diseases attack the germinating seeds and young plants, but are carried by the transplanting earth with the young plants to the open field where they have a much greater opportunity to do a considerable further damage.

The difficulties encountered in attempting to germinate seeds in ordinary soil have long been recognized and attempts have been made to obviate the difficulties.

Chemicals have been used to sterilize the soil, but these chemicals are not so effective in soil where the temperature is below, say about 50 degrees F., as it generally is in the fall and early spring. Furthermore there is likely to be a residue from the chemicals which in time acts deleteriously to the soil.

Heat has been used to sterilize soil. Shallow pans have been placed in heated ovens provided with openings to allow the gases and vapors to escape. This method is awkward and expensive and suffices only for the treatment of small quantities of soil. It is particularly unsuited for the treatment of soil where large quantities of thoroughly sterilized soil are needed at infrequent intervals, as during the seed planting season.

Steam has been issued directly into the soil to sterilize it, but this method has a disadvantage that the earth is often puddled or wet spots formed which are entirely undesirable to the seed planter.

A principal object of applicant's invention is to provide a method and means for sterilizing soil which will be relatively inexpensive in operation, and also relatively inexpensive in construction, but which, nevertheless, will be easy to manipulate, and thoroughly efficient, both for small and for large bodies of soil, even when these bodies are treated at infrequent intervals.

A further object of the invention is the production of a device of the type specified which will be adaptable to the production of sterilized soil from ordinary soil which in all cases may be regulated, by even an unskilled person, so as to produce a sterilized soil which is not only light but friable.

A further object of the invention is a method and means for sterilizing soil which is of such a nature that no harmful residue will remain in the soil, no wet spots will be formed, and the same soil may be used over and over again.

Other objects and advantages will appear as the description of the particular physical embodiment selected to illustrate the invention progresses and the novel features will be particularly pointed out in the appended claims.

In describing the invention in detail, and the particular physical embodiments selected to illustrate the invention, reference will be had to the accompanying drawings and the several views therein, wherein like characters of reference designate like parts throughout the several views, and in which:

Figure 1 is a front perspective view of a device embodying applicant's soil sterilizer invention; Fig. 2 is a top plan view of the device as shown by Fig. 1 with the top cover removed; Fig. 3 is a cross-sectional view on the plane indicated by the line III—III of Fig. 1, viewed in the direction of the arrows at the ends of the line; Fig. 4 is a vertical sectional view of a heater unit used in connection with the device of Fig. 1; Fig. 5 is a sectional view on the plane indicated by the line V—V of Fig. 4, viewed in the direction of the arrows at the ends of the line; Fig. 6 is a view similar to Fig. 3, that is, a sectional view on the plane indicated by the line III—III of Fig. 1 viewed in the direction of the arrows at the ends of the line, but with a bottom closure of the device shown in an open position; Fig. 7 is a rear elevational view of the device, as shown by Fig. 1, with the back door broken away to more clearly show the internal arrangements.

The device, in general, comprises a hollow vessel A; a removable cover C; a hinged swinging bottom B; a plurality of heating units H, shown in detail section in Fig. 4; and electrical circuits and controlling devices designated generally as E, best shown in Fig. 7.

The soil to be sterilized is placed in the vessel A through the opening made by removing the cover C while the bottom B is held securely in place as shown in Fig. 1. The heating units H are then energized and the material subjected to the heat thereby produced for such a length of time as will properly sterilize the particular batch of soil being treated.

The particular preferred form of applicant's invention of soil sterilizer is one raised on standards or legs so that the bottom thereof is such a distance from the floor that plenty of room is provided under the body of the device to manipulate treated earth. As shown in Fig. 1, the legs 1, 2, 3 and 4 are of metal, preferably iron, and in the most approved form they are angle iron. Each leg is formed with suitable orifices for the insertion of bolts or other fastening means.

The side walls of the vessel A are composed of any suitable and appropriate material, preferably, at least, somewhat of a poor heat conductor. Applicant prefers to form the side walls of wood. In order to keep the side walls in place, and to make a tight joint between the several side walls, applicant fastens the front wall 5 by means of bolts, as 6, to one flange of each of the angle irons 1 and 2, forming the board so that its end is flush with the outside of the other flange of the angle irons. The rear wall of the vessel A is also formed of a board or boards 7 which is likewise fastened, as by bolts 8, to flanges of the angle irons 3 and 4, as best shown in Fig. 2. The side walls 9 and 10 of the vessel A are fastened likewise to the angle irons 1, 2, 3, and 4 but are fastened by means of bolts 11 passing through those flanges of the angle irons at a right angle to the flanges to which the walls 6 and 7 are attached. The inside faces of the walls are preferably covered with a material which will quite successfully resist the wear and abrasion of the earth to be treated and also resist moisture. Applicant prefers to line the inner sides of the walls with sheet metal 52.

The bottom B is formed of any suitable or appropriate material, preferably wood. In order to prevent too rapid wear of the bottom it is faced with sheet metal 12, as best shown in Fig. 6. This sheet metal covers the entire upper face of the bottom and is carried down over the sides and ends. The bottom B is provided with angle irons, as 13 which are extended somewhat rearwardly of the bottom proper as best shown in Fig. 6, and are orificed to receive a rod 51 which is supported by the back legs 4 and 5. This hinge construction allows the bottom B to be raised into the position as shown in Fig. 3 or to be swung into the position as shown in Fig. 6.

In order to lift the bottom B into the horizontal position as shown in Fig. 3, applicant provides the handle 14, best shown in Fig. 1. Applicant also provides screw eyes 15 and 16 in the front edge of the bottom B. These screw eyes are adapted to cooperate with slotted hasp plates 17 and 18, each of which is pivoted to plates 19 and 20 respectively, which are suitably attached, as by screws, to the front wall 5 of the vessel A. When the bottom B is in the horizontal position, as shown in Fig. 3, and the pivoted hasp plates 17 and 18 are swung down over the screw eyes 15 and 16, then the insertion of pins, as 21, serves to hold the bottom securely in place, but in a manner such that it may be readily and quickly swung to the sloping position as shown in Fig. 6 where its front edge rests upon the supporting surface for the device. In order to prevent this front edge from becoming quickly broken and worn, applicant provides an angle iron 22 along the front lower face thereof as best shown in Fig. 6, securing the angle iron by screws 23 to the bottom B.

The top cover C for the device is formed of any appropriate or suitable material, but preferably of sheet iron, and is provided with downwardly projecting flanges 24 and 25, as best shown in Fig. 3. These flanges are appropriately attached to the plain flat material 26 of the cover, and so positioned that they fit nicely between the front wall 5 and the rear wall 7 of the vessel A. The cover is provided with any suitable or convenient manipulating means such as handles 27.

In order to suitably position the heating units H, applicant prefers to install channels, as 28, best shown in Fig. 2. One end of the heating unit H may be slipped into those channels so that it will be properly positioned and retained in proper position.

The heating units may be of appropriate form and construction, but applicant prefers a construction such as is illustrated by Figs. 4 and 5. The form of construction preferred includes, what is in effect a shallow pan 29. This pan may be made of any suitable and appropriate material, but sheet iron is preferred. At suitable intervals upon the broad inside face of the pan 29, suitable strips, preferably insulating, as 30 and 31, are positioned and rigidly held by any suitable and appropriate fastening means such as rivets 32. Each of these strips bears a plurality of knobs as 33, each of which is suitably attached to a strip, as 30 or 31, by suitable and appropriate fastening means, such as bolts, as 34. The knobs are made of appropriate material, preferably a vitrified clay such as porcelain.

The knobs 33 support a suitable electrical resistance wire 35 and 36 appropriate for heating purposes, such as nichrome, preferably formed into a net or lattice.

The resistance wire is in two portions, the upper portion 35, and a lower portion 36 each of which is served by separate leads. The upper portion is served by leads 37, and 38, and the lower portion is served by the leads 39 and 40.

Each of these leads 37, 38, 39 and 40 is protected by a surrounding porcelain tube, as 41, where it passes through the side of the metal pan 29.

In order to properly completely enclose the heating units 35 and 36, they are covered, by what is in effect another pan 42, best shown in Fig. 5. The sides of this inverted pan 42 fit nicely within the side walls of the pan 29 so as to exclude the entrance of foreign material. The top pan 42 is detachably connected to the pan 29 in any suitable and appropriate manner, as by screws 43 through the pan 42 entering studs 44 attached to the pan 29.

The leads 37, 38, 39 and 40 from each of the heating units H pass through the rear wall 7 of the vessel A and are bent around and connected as best shown in Fig. 7, forming the circuits designated generally by E. The electrical supply cable is designated 45. The two wires thereof pass through the switch 46, and then divide, one branch going to the leads 39 and 40 of each of the resistance heating coils 36, while the other branch goes to the switch 47 and thence to the leads 37 and 38 of each of the resistance heating coils 35. By such construction the lower coils 36 of each heating unit H may be energized independently of the heating coils 35, so that in case one desires to sterilize only a small body of earth filling about one half the space in the vessel A only the lower set of coils need to be energized, thereby saving electrical energy. If the vessel A is completely filled with earth to be sterilized then both switches 46 and 47 would be placed in a position such that both coils 35 and 36 of the heating unit H would be energized.

In order to prevent damage to the electrical controls E, applicant prefers to place a door 48 on the back of the device, and hinge the same by means of hinges 49 and 50, so that all of the parts designated generally by E are covered and protected.

Although applicant has illustrated and described one particular physical embodiment of his invention, and explained the construction, principle and mode of operation thereof, nevertheless, it is desired to have it understood that the form shown is merely illustrative, but does not exhaust the possible physical embodiments of the idea of means underlying the invention.

What is claimed as new and desired to secure by Letters Patent of the United States, is:

1. In a soil sterilizer, in combination: a plurality of walls forming an enclosed space with an upper and a lower opening; a removable cover for the upper opening; a bottom for closing the lower opening; means for supporting the bottom so that it may swing downwardly on one edge; means for releasably holding the bottom in place closing the lower opening; heating means within the space disposed so that both sides are exposed to material placed in the space, said heating means including an upper and a lower heating net; and means for supplying electrical energy to the lower net alone or to both nets in parallel; whereby soil placed in the space may be heated and thus sterilized.

2. In a soil sterilizer, in combination: a plurality of walls forming an enclosed space with an upper and a lower opening; a removable cover for the upper opening; a bottom for closing the lower opening; means for supporting the bottom so that it may swing downwardly on one edge; means for releasably holding the bottom in place closing the lower opening; heating means within the space disposed so that both sides are exposed to material placed in the space, said heating means including an upper and a lower heating net; and means for supplying electrical energy to the lower net alone or to both nets in parallel; and means for supporting the walls so that the bottom may swing through an angle sufficient to conveniently remove material placed in the space; whereby soil placed in the space may be heated and thus sterilized.

3. In a soil sterilizer, in combination: a plurality of walls forming an enclosed space with an upper and a lower opening; removable means for closing the upper opening; adjustable means for closing or opening the lower opening; means supporting the walls so that the said adjustable means may be operated; a plurality of vertically disposed heating units positioned in the space, each unit being formed into a lower and an upper heating net; and means for supplying electrical energy to all of the lower heating nets or all of the heating nets, whereby a large quantity of soil may be sterilized or a small quantity sterilized economically.

4. In a soil sterilizer, in combination: a vessel, including a removable cover and a downwardly swinging bottom; heating units within the vessel, each unit including an upper and a lower heating net; leads for the nets; a compartment adjacent the said vessel, one wall thereof formed by the vessel; and electric circuits and switching devices within the said compartment connected to the said leads whereby a lower net only or all coils may be energized.

ROBERT J. PARSONS.